(12) United States Patent
Lesovik et al.

(10) Patent No.: US 11,818,258 B2
(45) Date of Patent: Nov. 14, 2023

(54) METHOD AND SYSTEM FOR QUANTUM KEY DISTRIBUTION

(71) Applicant: Terra Quantum AG, St. Gallen (CH)

(72) Inventors: Gordey Lesovik, St. Gallen (CH); Dmitry Kronberg, St. Gallen (CH); Alexey Kodukhov, Rorschach (CH); Valeria Pastushenko, St. Gallen (CH); Nurbolat Kenbayev, St. Gallen (CH); Nikita Kirsanov, St. Gallen (CH); Pavel Sekatski, St. Gallen (CH); Valerii Vinokour, St. Gallen (CH); Asel Sagingalieva, St. Gallen (CH)

(73) Assignee: Terra Quantum AG, St. Gallen (CH)

( * ) Notice: Subject to any disclaimer, the term of this patent is extended or adjusted under 35 U.S.C. 154(b) by 58 days.

(21) Appl. No.: 17/675,570

(22) Filed: Feb. 18, 2022

(65) Prior Publication Data
US 2022/0271928 A1    Aug. 25, 2022

(30) Foreign Application Priority Data

Feb. 18, 2021 (EP) .................................. 21157942
Mar. 31, 2021 (EP) .................................. 21166427
Apr. 14, 2021 (EP) .................................. 21168449

(51) Int. Cl.
*H04L 29/06* (2006.01)
*H04L 9/08* (2006.01)
*G06N 10/20* (2022.01)

(52) U.S. Cl.
CPC ........... *H04L 9/0858* (2013.01); *G06N 10/20* (2022.01); *H04L 9/0838* (2013.01)

(58) Field of Classification Search
None
See application file for complete search history.

(56) References Cited

U.S. PATENT DOCUMENTS

| | | | | |
|---|---|---|---|---|
| 8,650,401 B2* | 2/2014 | Wiseman | ............... | H04L 63/061 380/256 |
| 8,755,525 B2* | 6/2014 | Wiseman | ............... | H04L 9/0852 380/278 |

(Continued)

FOREIGN PATENT DOCUMENTS

| | | |
|---|---|---|
| CN | 108768542 A | 11/2018 |
| CN | 109194468 A | 1/2019 |
| WO | 2020/177848 A1 | 9/2020 |

OTHER PUBLICATIONS

Alshowkan, Muneer; Elleithy, Khaled. Entanglement measurement-device-independent Quantum Key Distribution. 2017 IEEE Long Island Systems, Applications and Technology Conference (LISAT). https://ieeexplore.ieee.org/stamp/stamp.jsp?tp=&arnumber=8001976 (Year: 2017).*

(Continued)

*Primary Examiner* — Jeremiah L Avery
(74) *Attorney, Agent, or Firm* — Leydig, Voit & Mayer, Ltd.

(57) ABSTRACT

A system and method for quantum key distribution includes determining an intrinsic loss along a quantum channel; generating a pulse sequence; transmitting the pulse sequence via the quantum channel; receiving the pulse sequence; determining invalid signal positions and providing the invalid signal positions; determining a first reconciled signal from the first signal and the invalid signal positions, and determining a second reconciled signal from the second signal and the invalid signal positions; determining a total loss along the quantum channel from the at least one test pulse received, determining a signal loss from the total loss and the intrinsic loss, and providing the signal loss; determining a shared by error correcting the first reconciled signal and the second reconciled signal; and determining an amplified key from the shared key by shortening the shared (Continued)

key by a shortening amount that is determined from the signal loss.

15 Claims, 10 Drawing Sheets

(56) References Cited

U.S. PATENT DOCUMENTS

| | | | |
|---|---|---|---|
| 2014/0099104 A1 | 4/2014 | Peters et al. | |
| 2016/0352515 A1* | 12/2016 | Bunandar | H04L 9/0852 |
| 2017/0126316 A1 | 5/2017 | Yuan et al. | |
| 2017/0331623 A1* | 11/2017 | Fu | G06F 21/602 |
| 2017/0338951 A1* | 11/2017 | Fu | H04L 9/0852 |
| 2018/0062842 A1* | 3/2018 | Arahira | H04L 9/30 |
| 2019/0141016 A1* | 5/2019 | Borrill | H04L 9/0852 |
| 2023/0176557 A1* | 6/2023 | Cella | G05B 19/4184 700/117 |

OTHER PUBLICATIONS

Tang, Xinke et al. Quantum-Safe Metro Network With Low-Latency Reconfigurable Quantum Key Distribution. Journal of Lightwave Technology, vol. 36, Issue: 22. https://ieeexplore.ieee.org/stamp/stamp.jsp?tp=&arnumber=8466887 (Year: 2018).*

Ur Rehman, Junaid et al. Quantum key distribution with a control key. 017 International Symposium on Wireless Communication Systems (ISWCS). https://ieeexplore.ieee.org/stamp/stamp.jsp?tp=&arnumber=8108093 (Year: 2017).*

European Patent Office, Extended European Search Report in European Patent Application No. 21166427.1 (dated Sep. 22, 2021).

European Patent Office, Extended European Search Report in European Patent Application No. 21157942.0 (dated Jul. 26, 2021).

European Patent Office, Extended European Search Report in European Patent Application No. 21168449.3 (dated Sep. 23, 2021).

Lodewyck et al., "Controlling excess noise in fiber optics continuous variables quantum key distribution," Arxiv.org, Cornell University Library, 201 Olin Library, Cornell University, Ithaca, NY (2005).

Maroy et al., "Secure detection in quantum key distribution by real-time calibration of receiver," Arxiv.org, Cornell University Library, 201 Olin Library, Cornell University, Ithaca, NY (2016).

Lo et al., "Decoy State Quantum Key Distribution," Physical Review Letters, 94, 230504, x pp. (Jun. 16, 2005).

* cited by examiner

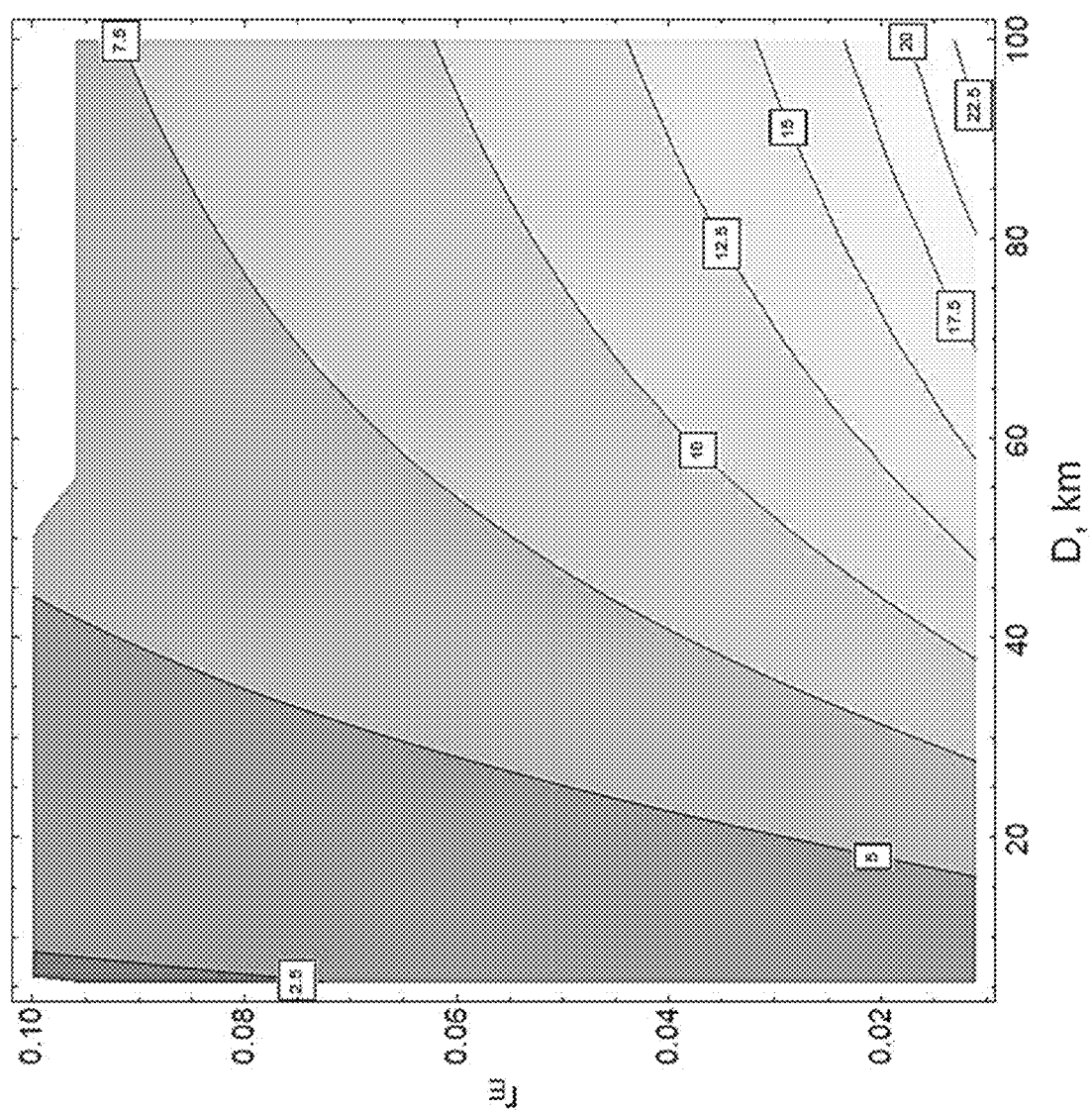

METHOD AND SYSTEM FOR QUANTUM KEY DISTRIBUTION

CROSS-REFERENCE TO RELATED APPLICATIONS

This patent application claims priority to European Patent Application Ser. Nos. 24457942.0, filed on Feb. 18, 2021; 21166427.1, filed on Mar. 31, 2021; and 21168449.3, filed on Apr. 14, 2021, each of which is incorporated herein in its entirety by this reference.

FIELD OF THE DISCLOSURE

The present disclosure relates to a method and a system for quantum key distribution (QKD).

BACKGROUND OF THE INVENTION

Traditional approaches to quantum key distribution require an assumption that all errors and losses are due to eavesdropping activity. This forces legitimate users to equate the knowledge of an eavesdropper of a shared raw key with the mutual information between the device of one of the legitimate users and a device that describes the lost part of the signal. As a result, a sharp reduction of key length is required during privacy amplification to obtain a reliably secure key.

BRIEF SUMMARY OF THE INVENTION

It is an object of the present disclosure to provide improved techniques for transmitting data via quantum key distribution, in particular, for increasing an achievable key rate and/or distance between legitimate devices. For solving the problem, a method and a system for quantum key distribution are provided according to the independent claims. Further embodiments are disclosed in dependent claims.

BRIEF DESCRIPTION OF THE SEVERAL VIEWS OF THE DRAWING(S)

In the following, embodiments, by way of example, are described with reference to the Figures, in which:

FIG. 10 shows a plot of a key rate ratio as a function of distance and signal loss for a BB-84 protocol.

DETAILED DESCRIPTION OF THE INVENTION

Figure 1:
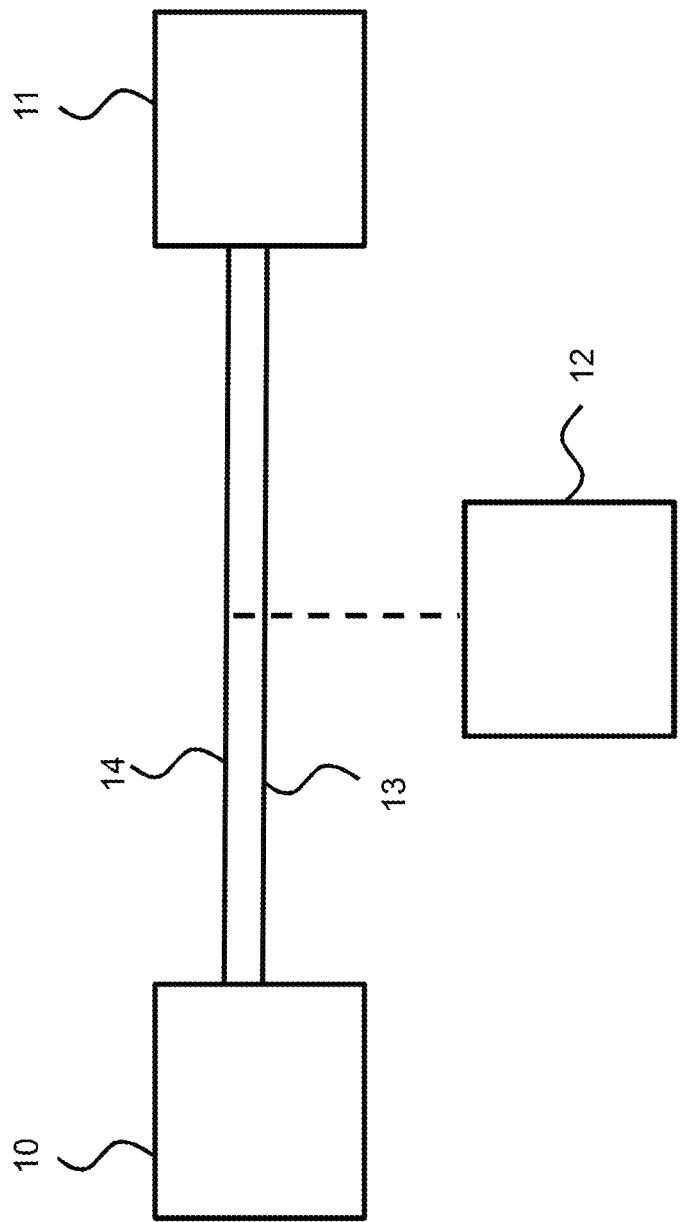
FIG. 1 shows a graphical representation of an arrangement of a system for quantum key distribution and a potential eavesdropping device.

According to one aspect, the present disclosure describes a method for quantum key distribution. The method, in a system with a plurality of data processing devices, comprising: determining, in at least one of a first data processing device and a second data processing device, an intrinsic loss along a quantum channel between the first data processing device and the second data processing device; generating, in the first data processing device, a first signal; generating, in the first data processing device, a pulse sequence comprising at least one test pulse and signal pulses generated from the first signal; transmitting the pulse sequence from the first data processing device via the quantum channel to the second data processing device; receiving the pulse sequence in the second data processing device and determining, in the second data processing device, a second signal from the pulse sequence; determining invalid signal positions and providing the invalid signal positions in the first data processing device and the second data processing device; determining, in the first data processing device, a first reconciled signal from the first signal and the invalid signal positions and determining, in the second data processing device, a second reconciled signal from the second signal and the invalid signal positions; determining a total loss along the quantum channel from the at least one test pulse received in the second data processing device, determining a signal loss from the total loss and the intrinsic loss, and providing the signal loss in the first and the second data processing device; determining a shared key in the first and the second data processing device by error correcting the first reconciled signal in the first data processing device and error correcting the second reconciled signal in the second data processing device; and determining an amplified key in the first and the second data processing device from the shared key by shortening the shared key by a shortening amount that is determined from the signal loss.

According to another aspect, a system for quantum key distribution is provided, the system comprising a plurality of data processing devices and configured to perform: determining, in at least one of a first data processing device and a second data processing device, an intrinsic loss along a quantum channel between the first data processing device and the second data processing device; generating, in the first data processing device, a first signal; generating, in the first data processing device, a pulse sequence comprising at least one test pulse and signal pulses generated from the first signal; transmitting the pulse sequence from the first data processing device via the quantum channel to the second data processing device; receiving the pulse sequence in the second data processing device and determining, in the second data processing device, a second signal from the pulse sequence; determining invalid signal positions and providing the invalid signal positions in the first data processing device and the second data processing device; determining, in the first data processing device, a first reconciled signal from the first signal and the invalid signal positions and determining, in the second data processing device, a second reconciled signal from the second signal and the invalid signal positions; determining a total loss along the quantum channel from the at least one test pulse received in the second data processing device, determining a signal loss from the total loss and the intrinsic loss, and providing the signal loss in the first and the second data processing device; determining a shared key in the first and the second data processing device by error correcting the first reconciled signal in the first data processing device and error correcting the second reconciled signal in the second data processing device; and determining an amplified key in the first and the second data processing device from the shared key by shortening the shared key by a shortening amount that is determined from the signal loss.

The first signal may be a bit string, preferably generated employing a physical random number generator. Each signal pulse may correspond to a signal position of the first and the second signal. A signal position may also correspond to two signal pulses or a plurality of signal pulses. The pulse sequence may also comprise decoy pulses.

In the context of the present disclosure, determining the intrinsic loss along the quantum channel may comprise a step of measuring the intrinsic loss along the quantum channel. Alternatively, or additionally, the intrinsic loss may also be determined on the basis of pre-collected measurements or manufacturer information.

The intrinsic loss may be detected using at least one optical reflectometer. The intrinsic loss may be determined by pre-detecting and documenting naturally appearing events, preferably by the optical reflectometer. The events may comprise losses on connectors, welds, bends, and/or cracks.

The quantum channel may comprise an optical fiber and/or the test pulse and the signal pulses may be light pulses.

A transmittance of the optical fiber may scale as $T=10^{-\mu \cdot D}$, wherein D denotes the length (e.g., in km) of the optical fiber between the first data processing device ("Alice") and the second data processing device ("Bob") and $\mu$ denotes a loss parameter, which for example may take a value between $10^{-3}$ km$^{-1}$ and $10^{-1}$ km$^{-1}$. In particular, $\mu$ may be equal to 0.02 km$^{-1}$.

The intrinsic loss (intrinsic natural losses) may comprise Rayleigh scattering losses and Raman scattering losses. It may be provided that the intrinsic loss is not caused by an eavesdropping device ("Eve").

The intrinsic loss may be determined by measuring the decrease of intensity of an initial signal which is generated in the first data processing device and transmitted via the quantum channel to the second data processing device. The intrinsic loss may be provided in the first and the second data processing device. The initial signal may comprise at least one light pulse.

The invalid signal positions may be provided in the first data processing device and the second data processing device via a public channel. The public channel may be an authenticated public classical channel. The first data processing device and the second data processing device may exchange classical signals via the public channel. Classical signals may also be exchanged via the quantum channel. The optical fiber may be shared by the quantum channel and the classical channel. Alternatively, the quantum channel and the classical channel may be separate.

The quantum channel may comprise no or not more than one amplifier (for example, an in-line Erbium dope fiber amplifier (EDFA) or a Raman amplifier).

It may also be provided that the quantum channel has an average amplifier density smaller than 2 amplifiers per 110 km, preferably smaller than 2 amplifiers per one of 120 km, 130 km, 150 km or 200 km.

It may also be provided that a distance between two adjacent amplifiers in the quantum channel is larger than 55 km, preferably larger than one of 60 km, 70 km, 80 km or 100 km.

The quantum channel may be configured such that the intrinsic loss is homogeneously distributed along the quantum channel.

It may be provided that the eavesdropping device may only have local physical access to the quantum channel. For example, the eavesdropping device may have access to less than 1% or 0.1% of the length of the quantum channel.

An auxiliary bit sequence may be encoded in a single test pulse. In particular, the single test pulse may be verified in the second data processing device according to the auxiliary bit sequence.

Thus, the total loss may be determined from the single test pulse.

Encoding the auxiliary bit sequence in the single test pulse may comprise modifying at least one of test pulse parameters. The test pulse parameters may comprise intensity, phase, length and shape of a test pulse. The phase may be sampled from the interval $[0, \pi)$ and/or the length may be sampled from the interval $[1 \text{ ns}, 10^6 \text{ ns}]$.

The pulse sequence may comprise a plurality (sequence) of test pulses and the auxiliary bit sequence may be encoded in the plurality of test pulses. Preferably, the plurality of test pulses may be verified in the second data processing device according to the auxiliary bit sequence.

Encoding the auxiliary bit sequence in the plurality of test pulses may also comprise modifying at least one of the test pulse parameters.

Verifying the single test pulse or the plurality of test pulses may comprise determining whether the auxiliary bit sequence is encoded in the single test pulse or the plurality of test pulses received in the second data processing device.

The single test pulse or the plurality of test pulses may be discarded if the auxiliary bit sequence is determined not to be encoded in the single test pulse or the plurality of test pulses received in the second data processing device. In case the single test pulse or the plurality of test pulses are discarded, another test pulse or another plurality of test pulses may be transmitted from the first data processing device to the second data processing device.

A test pulse sequence length may be larger than a signal pulse length. Preferably, the test pulse sequence length may be $10^3$ to $10^6$ times larger than the signal pulse length. In particular, the test pulse sequence length may be 1 ms and the signal pulse length may be 1 ns.

The test pulses and the signal pulses may each have the same constant power, for example a value between 0,1 µW and 10 µW, in particular, 2 µW.

An average number of photons per test pulse may be between $10^6$ and $10^{12}$, in particular $10^{10}$.

The auxiliary bit sequence may be generated in the first data processing device and transmitted to the second data processing device, preferably after the single test pulse or the plurality of test pulses is measured in the second data processing device. The auxiliary bit sequence may be transmitted via the public channel. The auxiliary bit sequence may be randomly generated.

The first reconciled signal may be determined from the first signal by discarding the invalid signal positions from the first signal. Further, the second reconciled signal may be determined from the second signal by discarding the invalid signal positions from the second signal.

The invalid signal positions may be determined in the first and/or the second data processing device.

At least one of the invalid signal positions may be determined by detecting an inconclusive measurement result of a corresponding signal pulse in the second data processing device.

At least one of the invalid signal positions may be determined by detecting a differing preparation basis in the first data processing device and measurement basis in the second data processing device for a corresponding signal pulse.

The total loss may be determined from a first intensity of the at least one test pulse generated in the first data processing device and a second intensity of the at least one test pulse received in the second data processing device.

In particular, the total loss may be determined from a decrease from the first intensity to the second intensity.

The signal loss may be determined by subtracting the intrinsic loss from the total loss.

The total loss and/or the signal loss may be determined in the first and/or second data processing device. The signal loss may be provided in the first and the second data processing device by sharing the signal loss via the public channel.

A number of invalid positions may depend on the signal loss.

The method may further comprise estimating, in the first and the second data processing device, an error rate from the first and/or the second reconciled signal.

First error information from the first reconciled signal may be generated in the first data processing device and transmitted to the second data processing device.

Conversely, second error information from the second reconciled signal may be generated in the second data processing device and transmitted to the first data processing device.

The error rate may be determined in the first data processing device and the second data processing device from the first error information and the second error information. The first error information may comprise first parity bits of the first reconciled signal or parts thereof. The second error information may comprise second parity bits of the second reconciled signal or parts thereof. The error rate may be determined by comparing the first parity bits and the second parity bits.

The first error information may also comprise a first digit position subset of the first reconciled signal and the second error information may comprise a second digit position subset of the second reconciled signal.

The shared key may be shortened by applying a hashing method on the shared key.

In particular, a hash function mapping a key with a first key length to a key with a second key length may be applied to the shared key. The first key length may be equal to the length of the shared key. The second key length may be the first key length minus the shortening amount. The hashing function may be randomly determined. Subsequently, the hashing function may be shared between the first and the second data processing device.

Preferably, a random binary Toeplitz matrix may be applied to the shared key. The Toeplitz matrix may comprise a column number equal to the first key length and a row number equal to the first key length minus the shortening amount.

The shortening amount may be determined from the signal loss and further from an intensity of at least one of the signal pulses, preferably an average intensity of the signal pulses.

In particular, the shortening amount may be determined from the signal loss and further from a mean photon number of the signal pulses in the first and/or second data processing device.

The shortening amount may be determined from a product of the signal loss and an intensity of at least one of the signal pulses (in the first and/or second data processing device), preferably an average intensity of the signal pulses.

In particular, the shortening amount may be determined from a product of the signal loss and a mean photon number of the signal pulses in the first and/or second data processing device.

The shortening amount may be determined by calculating a mutual information, preferably between the first data processing device and the eavesdropping device.

The intensity of the signal pulses may be adjusted so that a length of the shared key is maximized. In particular, the intensity of each of the signal pulses and/or the average intensity of the signal pulses may be adjusted so that the length of the shared key is maximized.

More generally, the first intensity of the test pulse and/or the intensity of the signal pulses may be adjusted depending on the intrinsic loss.

The method may adhere to at least one (in particular: one) of a coherent one-way protocol, a differential phase shift protocol, a BB-84 protocol, a B-92 protocol, a T-12 QKD protocol, a Y-00 QKD protocol, a (4+2)-QKD protocol, a SARG04 QKD protocol, and a six-state protocol.

Further, the protocol according to Corndorf et al., Quant. Inf. Comp. II, 5436:12-20, 2004 may be employed.

Within the context of the present disclosure, each of the coherent one-way protocol, the differential phase shift protocol, the BB-84 protocol, the B92 protocol (Bennett, PRL 68, 21: 3121-3124, 1992), the T-12 QKD protocol (cf. Lucamarini et al., Opt. Expr. 21(21):24550-24565, 2013) the Y-00 QKD protocol (cf. Hirota et al., Quant. Comm. Quant. Im., 5161:320-331, 2004), the (4+2)-QKD protocol (B. Huttner et al., PRA 51:1863-1869, 1995), the SARG04 QKD protocol (V. Scarani et al., PRL 92(5): 057901, 2004), and the six-state protocol (Bechmann-Pasquinucci et al., PRA 59(6):4238-4248) may also comprise variants of the respective protocol.

The aforementioned embodiments related to the method for quantum key distribution can be provided correspondingly for the system for quantum key distribution.

In FIG. 1, a graphical representation of an arrangement of a system for quantum key distribution and a potential eavesdropping device 12 (conventionally called "Eve") is shown. The system comprises a first data processing device 10 (conventionally called "Alice") and a second data processing device 11 (conventionally called "Bob"). Alice and Bob, as opposed to Eve, correspond to legitimate users of the system.

The first data processing device 10 and the second data processing device 11 can exchange signals, in particular quantum signals and quantum states, via a quantum channel 13 (transmission line). The quantum channel 13 comprises an optical fiber.

The first data processing device 10 and the second data processing device 11 can further exchange classical signals, in particular via a public channel 14. Classical signals may also be exchanged via the quantum channel 13. The optical fibre may be shared by the quantum channel 13 and the classical channel. Alternatively, the quantum channel and the classical channel can be physically separate.

The eavesdropping device 12 is assumed to have access to both the quantum channel 13 and the public channel 14.

Figure 2:
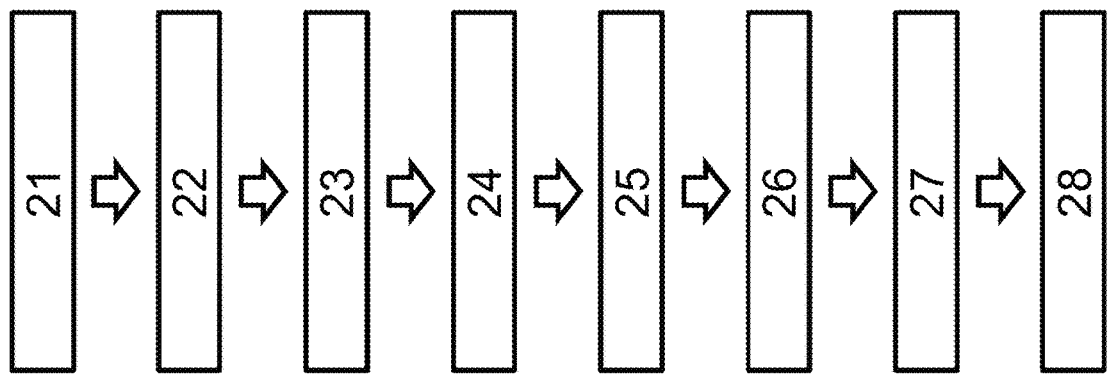
FIG. 2 shows a graphical representation of a method for quantum key distribution.

FIG. 2 shows a graphical representation of a method for quantum key distribution.

The proposed method involves physical control of the transmission line directed at detecting any intrusion of the eavesdropping device 12. One underlying aspect is that when the eavesdropping device tries to obtain information from transmitted pulses that carry photons in the optical fibre, inevitably physical access to the propagating modes is required. The formation of that physical access, which is local, can be detected via control of the propagation of the electromagnetic pulses through the transmission line.

With the proposed method, an exact proportion of the signal diverted by the eavesdropping device 12 can be determined and distinguished from natural losses in the quantum channel 13. Thus, an informational advantage of the first and the second data processing device 10, 11 over the eavesdropping device 12 can be accurately estimated, allowing for significantly longer secret keys after privacy amplification.

Namely, to monitor the activity of the eavesdropping device 12, test pulses are transmitted at appropriate intervals from the first data processing device 10 and corresponding intensities cross-checked with the second data processing device 11.

Assuming that the transmission line/optical fibre is properly installed (i.e., it does not have points of significant inflexions and crude junctions), most of the intrinsic losses occur due to Rayleigh scattering and Raman scattering. Such losses are distributed across the whole line. Therefore, the eavesdropping device 12 cannot pick up a dissipated signal effectively, unless the eavesdropping device 12 comprises an antenna covering a significant part of the transmission line. The concealed construction of such an antenna, however, is not practically feasible.

The only remaining option for the eavesdropper is to divert a part of the signal, that is to create and exploit additional losses apart from the intrinsic losses, e.g., by bending the optical fibre.

Such artificial losses, however, can be identified and measured by the first and the second data processing device 10, 11. This can be achieved by first determining the magnitude of losses not associated with the eavesdropper's activity, i.e., by measuring losses appearing homogeneously across the entire line before transmitting data signals. Subsequently, newly appearing local signal leaks, possibly intercepted by the eavesdropping device 12, can be accurately determined. This knowledge ensures the most efficient ciphering and measurements routines, determining, in turn, the post-selection procedure.

Hence, in a first step 21, the intrinsic (natural) loss $1-T$ (with transmittance T of the optical fibre scaling as $T=10^{-\mu \cdot D}$, length of the optical fiber D, and normalization constant $\mu$) along the quantum channel 13 between the first data processing device 10 and the second data processing device 11 is determined. The intrinsic loss $1-T$ is determined by measuring the decrease of intensity of an initial signal which is generated in the first data processing device 10 and transmitted via the quantum channel 13 to the second data processing device 11, in which it is received. The initial signal may comprise at least one light pulse.

The intrinsic loss $1-T$ may also be determined as a given and pre-determined parameter or characteristic of the optical fibre, such as by reference to a parameter table or fiber manufacturer information, provided that the parameter table or manufacturer information can be considered a sufficiently trustworthy source in the context of the present disclosure, Thus, local losses which could be caused by the eavesdropping device 12 can be distinguished from the intrinsic losses $1-T$, which are homogeneous across the entire optical fiber. As a part of an initial equipment setting, the determined intrinsic loss value $1-T$ is shared in the first and the second data processing device 10, 11 via the public channel.

The main contribution to the intrinsic losses in the optical line may be due to Rayleigh scattering (which is caused by the irregularity of the optical fiber density and does not exceed 0.2 dB/km for modern fibers) and losses associated with the specifics of routing, i.e., losses on connectors, welds, bends, cracks (also called "events").

These intrinsic losses can be detected using optical reflectometers. To distinguish the intrinsic losses from the ones appearing due to the eavesdropping device, all naturally appearing events may be pre-detected with the help of an optical reflectometer and documented.

Operating the optical reflectometer is based on measuring backscattered optical radiation, calculating distances to events by time delays in the arrival of the signal and displaying reflectograms, thus allowing a classification of the events. Modern reflectometers allow real-time recognition of events at distances up to 500 km.

In a second step 22, a first signal, namely a first bit sequence (bit string) $R_A$ of length L, is generated in the first data processing device 10. The first signal is encoded into a series of l signal (light) pulses generated in the first data processing device 10.

Additionally, a single test pulse or a plurality of test pulses are generated in the first data processing device 10, which together with the signal pulses form a pulse sequence of light pulses. The test pulse(s) do not contain information about the first bit sequence $R_A$, but are used for intrusion estimation. The test pulse(s) should preferably have the highest possible intensity, while ensuring that the detection means of the second data processing device 11 are not damaged.

A length $\tau_{test}$ of a test pulse sequence should be much larger than a length $T_{signal}$ of a signal pulse, e.g., $\tau_{test}=1$ ms and $\tau_{signal}=1$ ns. A test pulse sequence should contain many more photons than one signal pulse. Both types of pulses can comprise the same constant power P, e.g., P=2 µW. An average number of photons per test pulse is $\langle n_{test}^A \rangle = P\tau_{test}/h\nu \sim 10^{10}$, where $\nu$ is the light frequency.

In order to ensure that the test pulses are not manipulated, e.g., by the eavesdropping device 12, the test pulse(s) are adjusted as follows.

In case of a single test pulse, an auxiliary bit sequence is generated in the first data processing device 10 and encoded in the test pulse. The auxiliary bit sequence may be encoded in the test pulse by modifying certain test pulse parameters, for example intensity, phase (e.g., from 0 to $\pi$), length (e.g., from 1 ns to $10^6$ ns), and/or shape of the test pulse.

In case of a plurality (sequence) of test pulses, the generated auxiliary bit sequence is encoded into the sequence of test pulses. To this end, intensity or phase of different test pulses may be adjusted in the plurality of test pulses.

If the parameters of the test pulses were known to an eavesdropper, the test pulses could in principle be intercepted, and manipulated test pulses could be sent from the eavesdropper to mask their presence. In order to prevent such a manipulation, the auxiliary bit sequence should be randomly generated, and the parameters only compared after the test pulses have been measured in the second data processing device 11. This way, the eavesdropper would be forced to first measure the pulses and subsequently reproduce them, which in turn would prolong transmission. Such a delay could easily be detected by the legitimate devices.

In a third step 23, the pulse sequence is transmitted from the first data processing device 10 via the quantum channel 13 to the second data processing device 11.

In a fourth step 24, the pulse sequence is received and measured in the second data processing device 11. Further, a second signal corresponding to a second bit sequence $R_B$ is determined from the pulse sequence in the second data processing device 11 by decoding the pulse sequence.

After the single test pulse or the plurality of test pulses have been received and measured in the second data processing device 11, the auxiliary bit sequence is transmitted to the second data processing device 11 and the corresponding test pulse parameters are verified.

Some of the pulse measurements in the second data processing device 11 may yield inconclusive results, or a wrong measurement basis may have been chosen for one of the pulses. The corresponding bit positions (invalid signal positions) should be discarded.

To do so, in a fifth step 25, signal positions corresponding to inconclusive results are transmitted from the second data processing device 11 to the first data processing device 10 via the public channel 14. Further, the corresponding preparation bases and measurement bases per signal position may be shared between the first and the second data processing device via the public channel 14 in order to identify a basis mismatch.

Thus, a first reconciled signal can be determined from the first signal and the invalid signal positions by discarding the invalid signal positions from the first signal. Analogously, a second reconciled signal can be determined from the second signal and the invalid signal positions by discarding the invalid signal positions from the second signal. Denoting the probability for a conclusive measurement result at the second data processing with $p'(\sqrt{})$, the length of the first and the second reconciled signal will be on average equal to $p'(\sqrt{}) \cdot L$.

In a sixth step 26, a total loss (value) $r_{total}$ along the quantum channel 13 is determined from the at least one test pulse received in the second data processing device 11. To this end, a decrease of intensity of the at least one test pulse from the first data processing device to the second data processing device is determined. In particular, the total loss $r_{total}$ can be determined via a scattering matrix.

Subsequently, a signal loss (value) $r_E$ is determined from the total loss $r_{total}$ and the intrinsic loss $1-T$ by subtracting the intrinsic signal loss $1-T$ from the total loss $r_{total}$, i.e., $r_E = r_{total} - (1-T)$. Further, the signal loss is shared in the first and the second data processing device 10, 11 via the public channel 14.

A measurement error $\delta n_{test}^B$ for a test pulse intensity $n_{test}^B$ at the second data processing device 11 arises due to the Poisson statistics of light, hence:

$$\delta n_{test}^B \sim \sqrt{n_{test}^B} = \sqrt{T \cdot n_{test}^A}, \quad (1)$$

wherein $n_{test}^A$ corresponds to a test pulse intensity at the first data processing device 10. One test pulse allows to detect a leakage of magnitudes $\delta T_{test} = \delta n_{test}^B / \langle n_{test}^B \rangle$. For the minimum detectable signal loss $r_{E,min}$ holds:

$$r_{E,min} \sim \delta T_{test} = \frac{1}{\sqrt{n_{test}^A}} \frac{1}{\sqrt{T}}. \quad (2)$$

Figure 3:
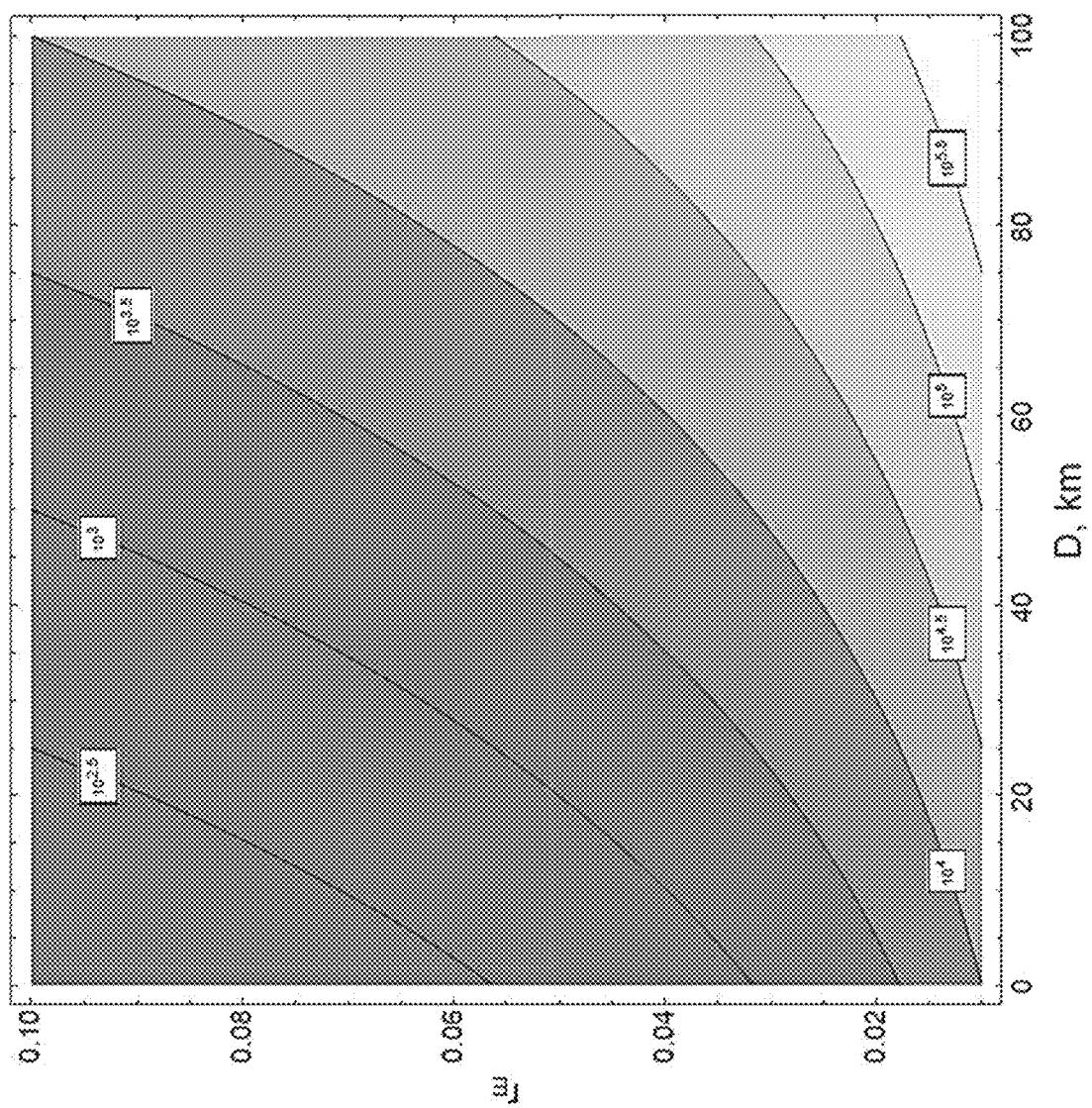
FIG. 3 shows a plot of test pulse intensity values of test pulses as a function of signal loss and distance.

FIG. 3 shows a plot of test pulse intensity values $\langle n_{test}^A \rangle$ of the test pulses as a function of $r_{E,min}$ and D (scaled in km). Lower values for $r_{E,min}$ and larger values for D correspond to larger values for $\langle n_{test}^A \rangle$.

In a seventh step 27 (cf. FIG. 2), error correction is carried out on the first and the second reconciled signal. To this end, first parity data may be generated from the first reconciled signal in the first data processing device 10 and transmitted to the second data processing device. Additionally or alternatively, second parity data may be generated from the second reconciled signal in the second data processing device 11 and transmitted to the first data processing device 10.

Subsequently, differences of the first reconciled signal and the second reconciled signal can be determined and corrected. The first parity data may comprise first parity bits of first data blocks of the first reconciled signal and the second parity data may comprise second parity bits of second data blocks of the second reconciled signal (CASCADE method). Alternatively, the first parity data may comprise a first syndrome of the first reconciled signal and the second parity data may comprise a second syndrome of the second reconciled signal (linear error-correcting code/linear block code method).

From the first parity data and/or the second parity data, an error rate may be estimated.

By error correcting the first and the second reconciled signal, a shared key is determined in both the first and the second data processing device 10, 11.

In an eighth step 28, an amplified key is determined in the first and the second data processing device 10, 11 from the shared key by shortening the shared key (privacy amplification). The shared key is shortened by a shortening amount that is determined from the signal loss. The eavesdropper will thus only have little information about the amplified key.

To this end, a random binary Toeplitz matrix T may be determined and publicly shared. The amplified key may be determined by multiplying (preferably left-multiplying) the Toeplitz matrix T to the shared key (preferably as a row vector). The column number of T may correspond to the length of the shared key and the row number of T may correspond to the length of the key minus the shortening amount determined from the signal loss.

Denoting the maximum mutual information between the first data processing device 10 and the eavesdropping device 12 (taking into account determining the signal loss according to the method) with max I'(A,E), the length of the amplified key may be expressed as $$L'_f = p'(\sqrt{}) L \cdot (1 - \max I'(A,E)). \quad (3)$$

By taking into account the determined signal loss within the method, the shortening amount will be significantly smaller in comparison to traditional approaches, yielding an amplified key with increased length.

In the following, the method will be further exemplified by some exemplary quantum key distribution protocols. However, the techniques of the present disclosure may likewise be practiced with variants of these protocols, or with other quantum key distribution protocols.

Coherent One-Way (COW) Quantum Key Distribution Protocol

Figure 4:
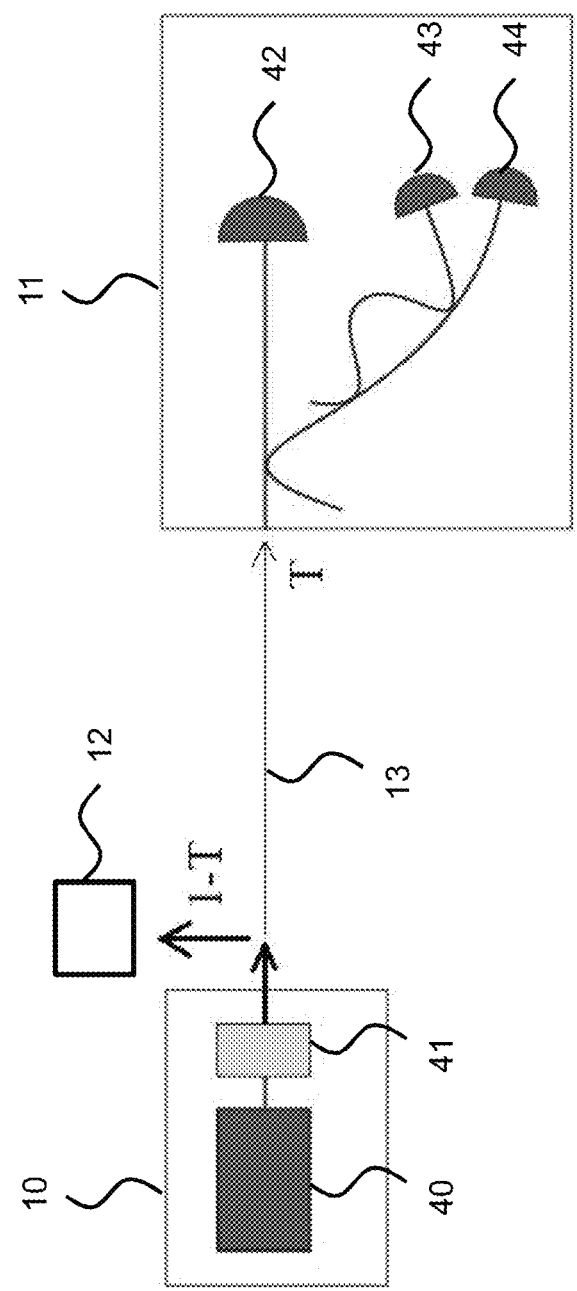
FIG. 4 shows a graphical representation of an arrangement of the system for quantum key distribution and the eavesdropping device for a coherent one-way protocol.

In a COW QKD protocol (cf., e.g., Stucki et al., Applied Physics Letters 87(19):194108, 2005), the first data processing device 10 comprises an attenuated laser 40 together with an intensity modulator 41 (cf. FIG. 4). The laser 40 is configured to prepare a coherent state with mean photon number $|\gamma|^2$ to encode the first signal, a random bit string, into double pulses consisting of a non-empty pulse (corresponding to quantum state $|\gamma\rangle$) and an empty pulse (corresponding to quantum state $|0\rangle$). Hence, a zero-value bit may be encoded as $|0\rangle|\gamma\rangle$ and a one-value bit as $|\gamma\rangle|0\rangle$.

The second data processing device 11 comprises a main detector 42, a second detector 43, and a third detector 44. The first and the second data processing device 10, 11 may estimate the visibility of the interference on the second and the third detector 43, 44 and use this to estimate the information intercepted by the eavesdropping device 12.

A small fraction f<<1 of all double pulses correspond to decoy states (decoy pulses) $|\gamma\rangle\gamma\rangle$. A long arm of an interferometer of the second data processing device 11 has a length such that two non-empty adjacent pulses interfere at the last beam-splitter (not shown in FIG. 4). Thus, the third detector 44 does not trigger for decoy states. The main detector 42 is used to monitor a time of arrival of one of the pulses. Because of the Poisson statistics for photon numbers in coherent pulses, the main detector 42 will sometimes not trigger for non-empty pulses. In the second data processing device 11, such measurement results will be interpreted as inconclusive.

After transmitting all pulses, the first data processing device 10 transmits information whether decoy pulses or signal pulses had been prepared to the second data processing device 11. The post-selection procedure involves analysing the decoy pulses and discarding the invalid signal positions, in particular signal positions corresponding to inconclusive results. The potential eavesdropping device 12 may introduce additional errors. Consequently, the second data processing device 11 will obtain more inconclusive results than to be expected because of the corresponding losses in the quantum channel 13.

In order to provide an upper estimate on the key rate in the original COW QKD protocol, any possible eavesdropping attack can be considered. For instance, the eavesdropping device 12 may be considered to have obtained the lost part of the signal. The maximum amount of information max I(A,E) obtained in the eavesdropping device 12 ("E") about a bit sent from the first data processing device 10 ("A") can be estimated via a Holevo bound, which for equiprobable states results in $$\max I(A, E) = \chi(|\sqrt{1-T} \cdot \gamma\rangle \otimes |0\rangle, |0\rangle \otimes |\sqrt{1-T} \cdot \gamma\rangle) \qquad (4)$$
$$= h_2\left(\frac{1}{2}(1 - |\langle\sqrt{1-T} \cdot \gamma|0\rangle|^2)\right),$$

wherein I(A,E) denotes the mutual information between the first data processing device 10 and the eavesdropping device 12, $\chi$ denotes the Holevo quantity/Holevo bound, $h_2$ denotes the binary entropy function, $T=10^{-\mu D}$ denotes the transmittance of the quantum channel 13 (the entire optical line), D denotes the length of the optical line, and $\mu$ denotes a loss parameter. A typical value for losses in optical fibres is $\mu=0.02$ km$^{-1}$.

The probability $p(\sqrt{})$ for a conclusive measurement result at the second data processing device 11 can be expressed as $$p(\sqrt{}) = 1 - \exp(-10^{-\mu D} \cdot |\gamma|^2), \qquad (5)$$

wherein $|\gamma|^2$ denotes a pulse intensity at the first data processing device 10.

To eliminate information obtainable in the eavesdropping device, privacy amplification/key distillation may be performed on the established shared key. For instance, the first and the second data processing device may agree (via the public authenticated channel 14 or, alternatively, before the protocol is carried out) on a random (hashing) function h: $\{0,1\}^{p(\sqrt{})L} \rightarrow \{0,1\}^{L_f}$, thereby shrinking the shared key with length $p(\sqrt{}) \cdot L$, obtained after post-selection procedure, to length $$L_f = \qquad (6)$$
$$p(\sqrt{})L \cdot (1 - \max I(A, E)) = p(\sqrt{})L \cdot \left(1 - h_2\left(\frac{1 - \exp(-(1-T) \cdot |\gamma|^2)}{2}\right)\right).$$

In case of determining the signal loss $r_E$ according to the proposed method, the probability of a conclusive measurement result is $$p'(\sqrt{}) = 1 - \exp(-10^{-\mu D} \cdot (1 - r_E) \cdot |\gamma|^2). \qquad (7)$$

For estimating a maximum information obtainable by the eavesdropping device 12, the corresponding Holevo bound yields $$\max I'(A,E) = \chi(|\sqrt{r_E}\gamma\rangle \otimes |0\rangle, |0\rangle \otimes |\sqrt{r_E}\gamma\rangle). \qquad (8)$$

Hence, after the post-selection procedure and privacy amplification, the amplified key according to the proposed method has length $$L'_f = \qquad (9)$$
$$p'(\sqrt{})L \cdot (1 - \max I'(A, E)) = p'(\sqrt{})L \cdot \left(1 - h_2\left(\frac{1 - \exp(-r_E \cdot |\gamma|^2)}{2}\right)\right).$$

The intensity $|\gamma|^2$ may be optimized in order to provide a maximum key rate for a particular attenuation magnitude $10^{-\mu D}$. This also allows the key rates of the original COW protocol (corresponding to key length $L_f$) and the COW protocol together with the proposed method (corresponding to key length $L'_f$) to be compared with each other.

To this end, Eq. (6) and Eq. (9) are respectively optimized and the respective optimal intensity is determined. For different values of $r_E$, different optimal intensities may be determined.

Figure 5:
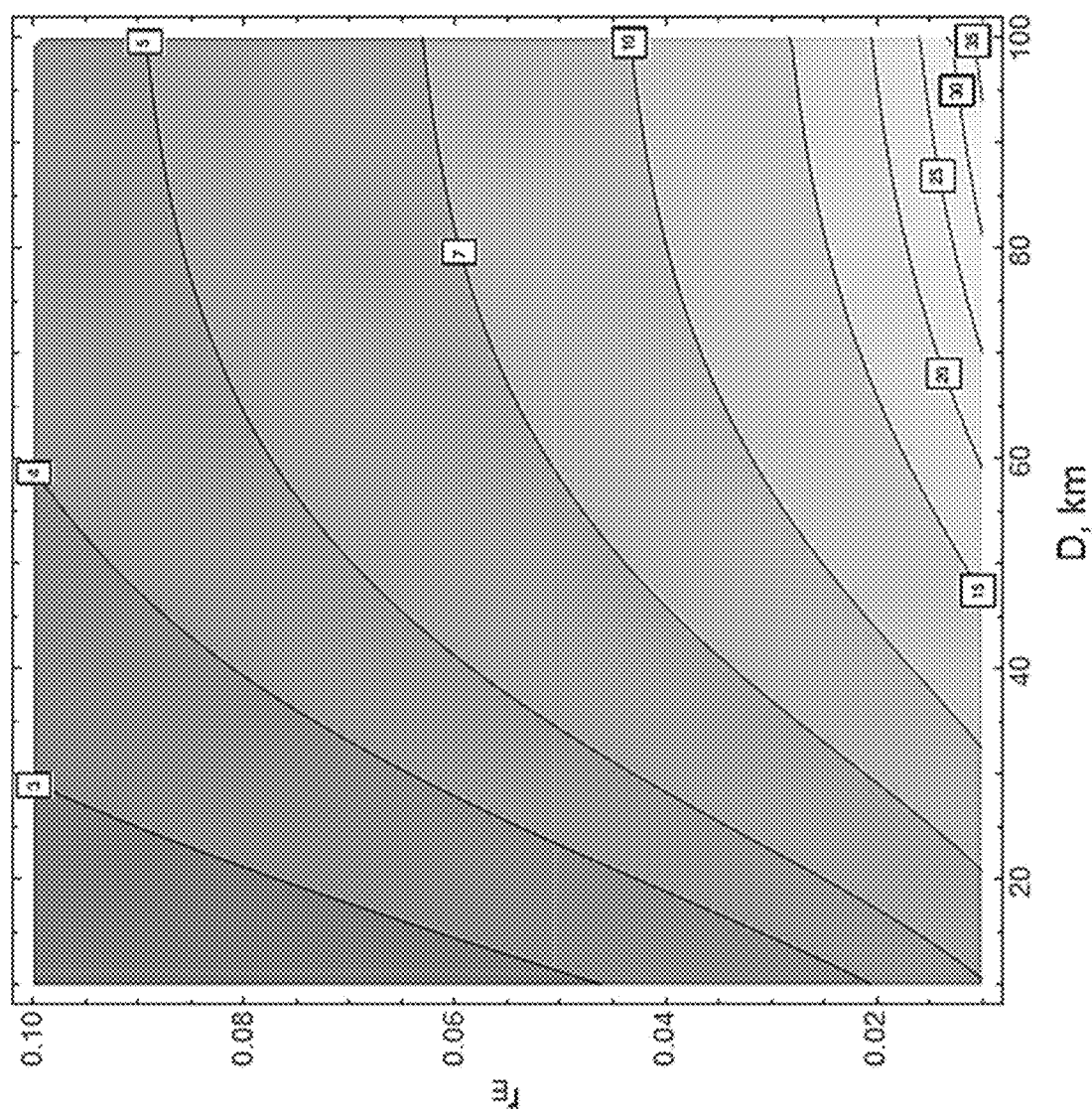
FIG. 5 shows a plot of an optimal intensity of signal pulses as a function of distance and signal loss.

FIG. 5 shows a plot of the optimal intensity of the signal pulses that maximizes Eq. (9) as a function of the distance D and the signal loss $r_E$ for $\mu=1/50$ km$^{-1}$. For any distance value D, the optical channel transmittance is $10^{-\mu D}$. By substituting the intensity optimal for $10^{-\mu D}$ in Eq. (6) and Eq. (9), the maximum key rate is calculated as a function of $r_E$ and D.

Figure 6:
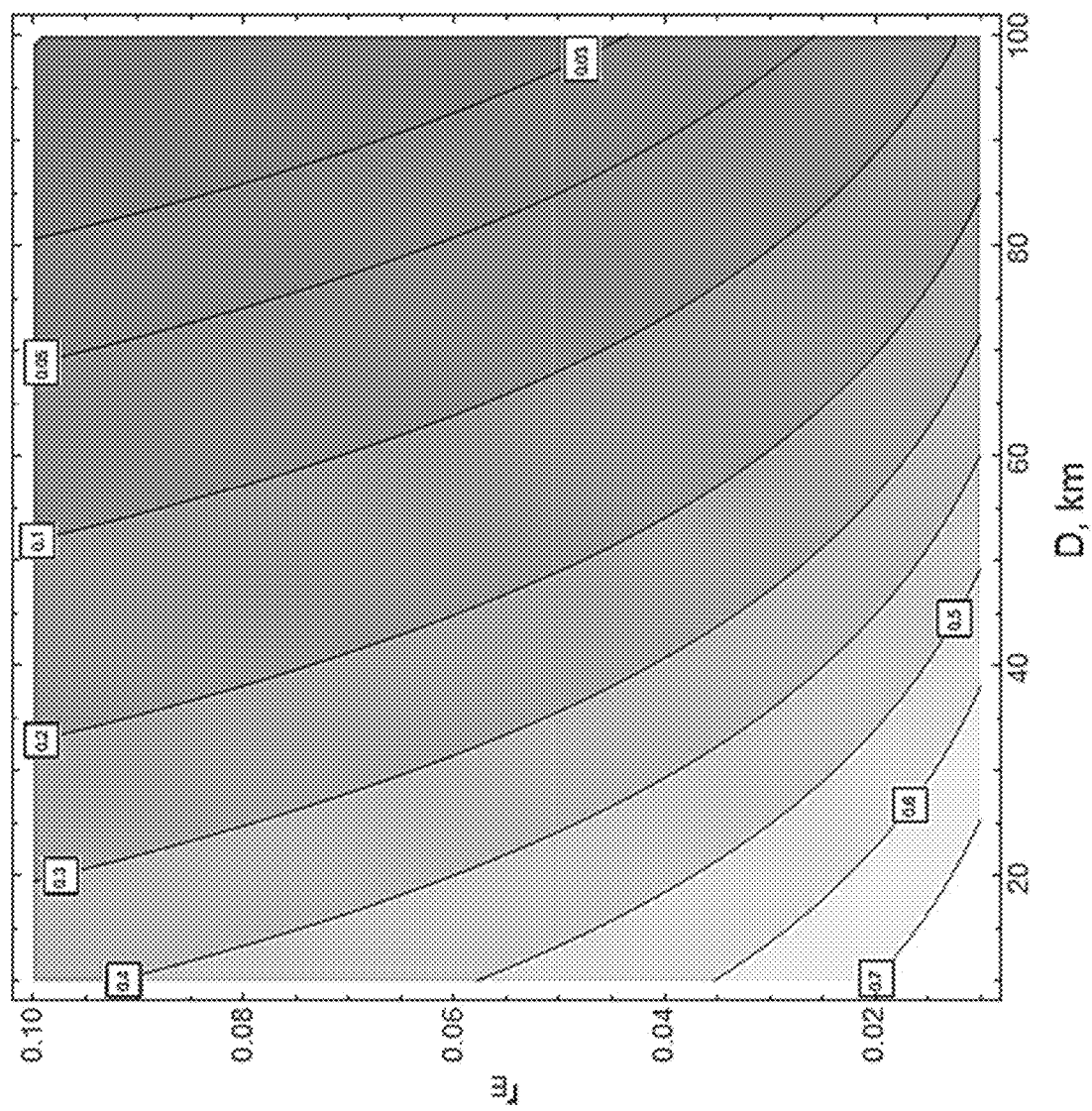
FIG. 6 shows a plot of a maximum key rate as a function of distance and signal loss.

FIG. 6 shows a corresponding plot of the maximum key rate as a function of the distance D and the signal loss $r_E$ for $\mu=1/50$ km$^{-1}$.

For comparison, a key rate ratio R/R$_{orig}$ between the key rate determined for the proposed method, R=$L'_f$/L, and the key rate for original COW protocol, R$_{orig}$=$L_f$/L is calculated.

Figure 7:
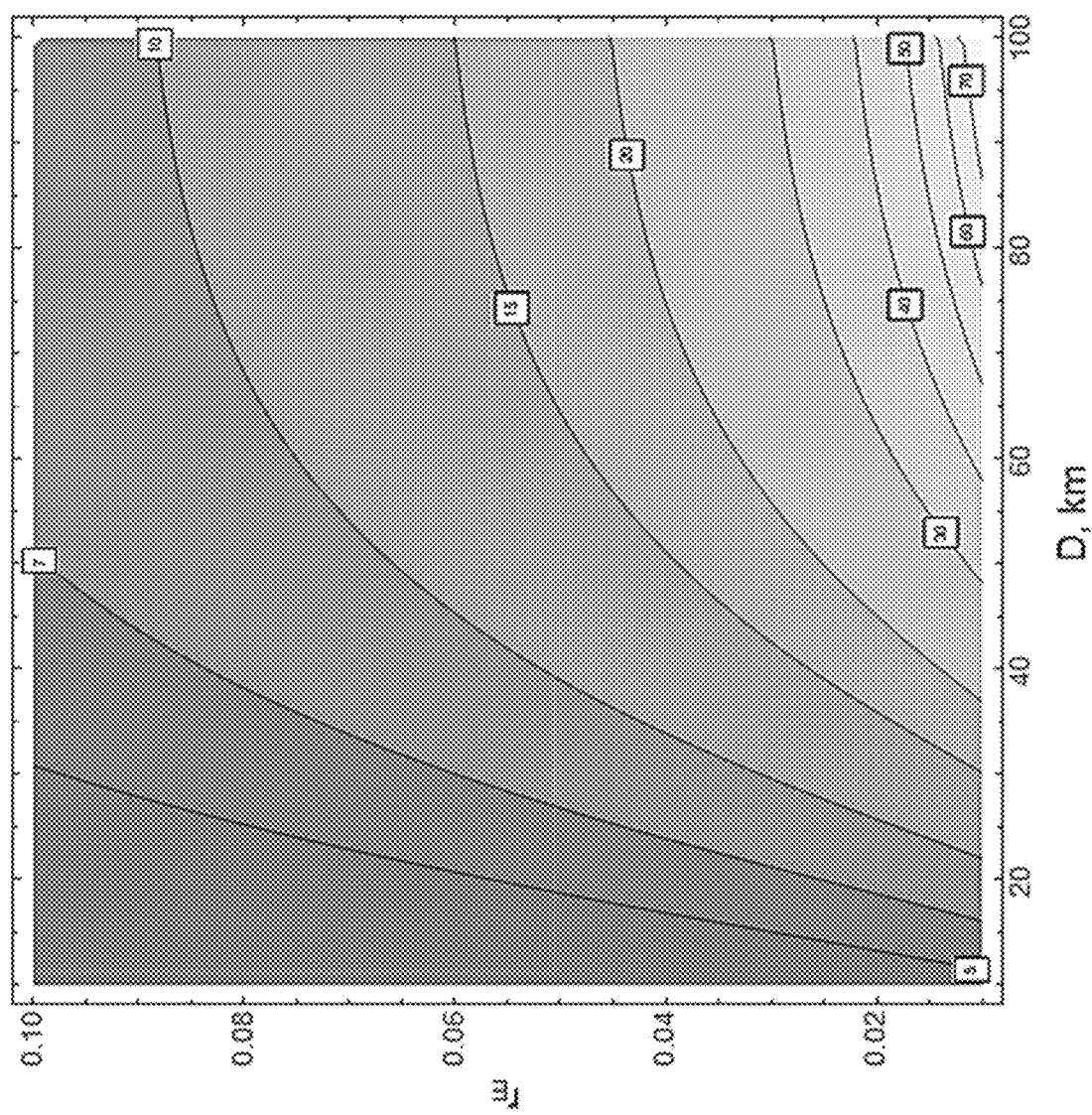
FIG. 7 shows a plot of a key rate ratio as a function of distance and signal loss.

FIG. 7 shows a plot of the key rate ratio R/R$_{orig}$ as a function of the distance D and the signal loss $r_E$ for $\mu=1/50$ km$^{-1}$. For the COW QKD protocol, the proposed method produces higher key rate value than the original approach, even in a pessimistic case where the eavesdropping device 12 is able to obtain around 10% of the signal (see the upper region in the plot in FIG. 7). A leakage control of roughly 10% still provides key rate values several times larger than in the original COW QKD protocol, especially at a distance D of around 100 km. For $r_E$ around 1%, the obtainable key rate from the proposed method is around 80 times larger.

Different types of eavesdropping attacks may be considered, in which the eavesdropper blocks pulses or introduces an additional signal. Such attacks can be immediately detected since some of the test pulses will be blocked.

Moreover, the wave packet shape of the test pulses will be noticeably changed by interaction of the eavesdropping device 12. In the case of the COW QKD protocol, this means that decoy states as well as an analysis of a large number of bits corresponding to decoy pulses are not required.

As a result, the framework of the COW QKD protocol can be significantly simplified by removing an interference unit from the second data processing device comprising the second and the third detector 43, 44. These modifications may lead to cost reduction and make QKD implementations more widely available.

Differential Phase Shift (DPS) QKD Protocol

Figure 8:
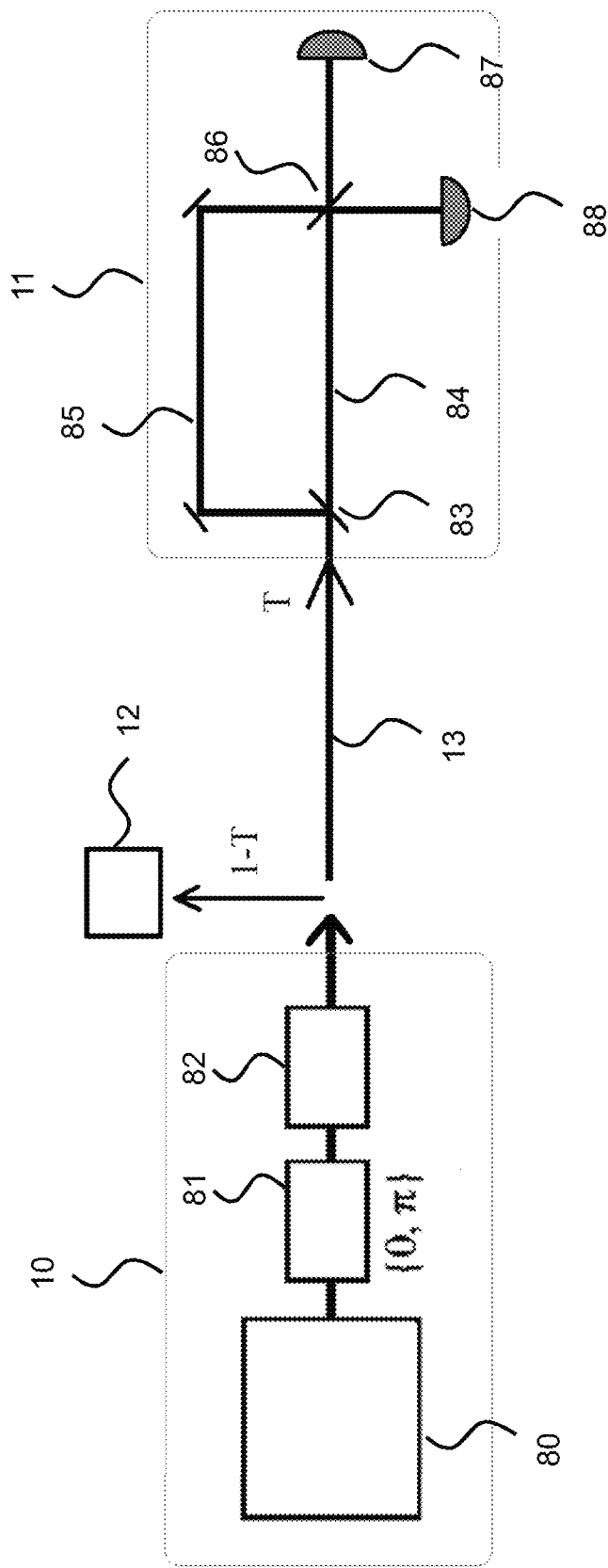
FIG. 8 shows a graphical representation of an arrangement of the system for quantum key distribution and the eavesdropping device for a differential phase shift protocol.

FIG. 8 shows a graphical representation of an arrangement of the system for quantum key distribution and the eavesdropping device for a differential phase shift QKD protocol.

In a DPS QKD protocol (cf. Inoue et al., Physical Review Letters 89:037902, 2002 and Inoue et al., Physical Review A 68:022317, 2003), coherent pulses created in a coherent light source 80 of the first data processing device 10 are randomly phase-modulated by 0 or $\pi$ by a phase modulation unit 81 and attenuated in an attenuation unit 82 for each time bin. In the second data processing device 11, each received pulse is split by a first 50:50 beam splitter 83 along a shorter path 84 and a longer path 85 and subsequently recombined by a second 50:50 beam splitter 86. The beam splitters 83, 86 together with the paths 84, 85 constitute an interferometer. The longer path 85 has a length such that two adjacent pulses interfere at the second beam-splitter 86.

This setup allows partial wave functions of two consecutive pulses to interfere with each other. With an appropriately determined phase in the interferometer, a first detector 87 clicks for a phase difference of 0 between the two consecutive pulses, and a second detector 88 clicks for a phase difference of $\pi$. After receiving the pulses, detection times at which the pulses have been detected by the second data processing device 11 are shared with the first data processing device 10. From the detection times and modulation data comprising the phase modulation for each pulse, the first data processing device 10 can determine which of the first and the second detector 87, 88 clicked for which pulse.

The bit value "0" may be identified with one of the quantum states $|\gamma\rangle |\gamma\rangle$ or $|-\gamma\rangle |-\gamma\rangle$ and the bit value "1" may be identified with one of the quantum states $|\gamma\rangle |-\gamma\rangle$ or $|-\gamma\rangle |\gamma\rangle$.

Defining that a first detector click corresponds to bit value "0" and a second detector click corresponds to bit value "1", an identical bit string, corresponding to the shared key can be established in both the first and the second data processing device 10, 11.

Considering an attack in which the eavesdropping device 12 obtains the whole lost part of the signal, the maximum amount of information obtained in the eavesdropping device 12 about a bit sent from the first data processing device 10 for the original DPS QKD protocol corresponds to $$\max I(A, E) = \chi(|\sqrt{1-T} \cdot \gamma\rangle \otimes |-\sqrt{1-T} \cdot \gamma\rangle, |\sqrt{1-T} \cdot \gamma\rangle \otimes |\sqrt{1-T} \cdot \gamma\rangle) \quad (10)$$

$$= h_2\left(\frac{1}{2}(1 - |\langle\sqrt{1-T} \cdot \gamma | -\sqrt{1-T} \cdot \gamma\rangle|^2)\right).$$

The structure of the formula Eq. (5) for the probability $p(\sqrt{})$ for a conclusive measurement is preserved. The key length after post selection and privacy amplification corresponds to $$L_f = p(\sqrt{})L \cdot \left(1 - h_2\left(\frac{1 - \exp(-4 \cdot (1-T) \cdot |\gamma|^2)}{2}\right)\right). \quad (11)$$

In contrast, in case of determining the signal loss $r_E$ according to the proposed method, the maximum information obtainable by the eavesdropping device 12 is $$\max I'(A,E) = \chi(|\sqrt{r_E}\cdot\gamma\rangle \otimes |-\sqrt{r_E}\cdot\gamma\rangle, |\sqrt{r_E}\cdot\gamma\rangle \otimes |\sqrt{r_E}\cdot\gamma\rangle) \quad (12)$$

and the amplified key has key length $$L'_f = \quad (13)$$
$$p'(\sqrt{})L \cdot (1 - \max I'(A, E)) = p'(\sqrt{})L \cdot \left(1 - h_2\left(\frac{1 - \exp(-4 \cdot r_E \cdot |\gamma|^2)}{2}\right)\right).$$

Because of the similarity of the expressions for the DPS protocol in Eq. (10) to Eq. (13) to the corresponding expressions of the COW protocol, an analysis of optimal signal intensities, key rates, and the key rate ratio $R/R_{orig}$ between the key rate for the protocol according to the proposed method and the original protocol will yield results similar to the DPS protocol.

BB-84 Protocol

In a BB-84 protocol (Bennett, Brassard: "Quantum cryptography: Public key distribution and coin tossing"; *Proceedings of IEEE International Conference on Computers, Systems and Signal Processing*, volume 175, page 8. New York, 1984), in the first data processing device 10, each bit of a randomly generated string is encoded into one of four quantum states $\{|0_x\rangle |1_x\rangle, |0_z\rangle, |1_z\rangle\}$, forming two mutually unbiased orthonormal bases X and Z. An i-th bit can be encoded into $|i_x\rangle$ or $|i_z\rangle$; the choice of the corresponding preparation basis is carried out randomly. The resulting pulse sequence is transmitted to the second data processing device 11.

In the second data processing device 11, a measurement basis out of $\{X, Z\}$ is chosen for each bit (with ½ probability of success) and the received states/pulses measured in the chosen measurement basis. Subsequently, the employed preparation bases (and/or measurement bases) are shared between the first and the second data processing device 10, 11, e.g., via the public channel 14. Thus, on average one half of the shared bits are discarded to obtain the shared key.

Originally, the BB-84 protocol had been conceived for using one-photon pulses. In experimental BB-84 realisations, an attenuated coherent laser light is frequently used as a source of one photon states. The laser generates weak coherent pulses (of a low intensity $|\gamma|^2$) with unknown random general phase, which is a statistical mixture of photon-number states $|n\rangle$ (Fock states) with Poisson distribution $P_n = \exp(-|\gamma|^2) \cdot |\gamma|^{2n}/n!$, resulting in the quantum state $$\hat{\rho} = \Sigma_{n=0}^{\infty} P_n |n\rangle\langle n|. \quad (14)$$

Correspondingly, the laser may also generate multiphoton pulses. This is in principle advantageous for a potential eavesdropper who can conduct photon number splitting (PNS) attack, obtain all surplus photons and store them in a quantum memory until the first data processing device 10 communicates the employed preparation bases to the second data processing device 11. The orthogonality condition $\langle 0_x | 1_x \rangle = \langle 0_z | 1_z \rangle = 0$ allows the eavesdropping device 12 to distinguish between the logical bits "0" and "1" without any additional error. Therefore, only one-photon pulses emitted by the laser of the first data processing device 10 may guarantee secure quantum key distribution. The length of a secret key that can be achieved in this case is $$L_f = L \cdot \tfrac{1}{2}[Q_1 - Q_1 \cdot h_2(e_1) - Q \cdot f(E) \cdot h_2(E)], \quad (15)$$

wherein Q denotes a gain of signal states/signal pulses (i.e., the probability that a signal state will be detected by the second data processing device 11), and E denotes a quantum bit error rate (QBER). Both of Q and E can be easily obtained experimentally. Further, $f(E) \in [0,1]$ denotes the efficiency of error-correction, $Q_1$ denotes a gain of single-photon states (i.e., a joint probability that a single-photon pulse has been emitted by the first data processing device 10 and detected by the second data processing device 11), and $e_1$ denotes the error rate for single-photon pulses.

The second data processing device 11 generally cannot distinguish between photons that originated from single-photon pulses and photons from multi-photon pulses. Thus, $Q_1$ and $e_1$ cannot be determined directly and have to be estimated. Currently, the most efficient estimation method is based on decoy states (cf. Lo et al., Physical Review Letters 94:230504, 2005 and Ma et al., Physical Review A 72:012326, 2005). To determine an upper bound for $L_f$ in Eq. (15), the non-negativity of the binary entropy function $h_2$ can be used, yielding $L_f \leq L \cdot \tfrac{1}{2} Q_1$.

The activity of the eavesdropping device 12 causes a decrease in the gain of single-photon states $Q_1$, which is maximal in case of no eavesdropping: $Q_1 \leq \tilde{Q}_1 = T \cdot |\gamma|^2 \exp(-|\gamma|^2)$. Consequently, the length of a shared secret key for the original BB-84 protocol can be upper bounded as follows:

$$L_f \leq L \cdot \tfrac{1}{2} T \cdot |\gamma|^2 \exp(-|\gamma|^2) \equiv \tilde{L}_f. \quad (16)$$

In case of applying the proposed techniques to the BB-84 protocol, similarly to the analysis of the line-controlled COW protocol, the determined signal losses $r_E$ are considered. The resulting probability of a conclusive result is $$p'(\sqrt{}) = \tfrac{1}{2}(1 - \exp(-T \cdot (1 - r_E)|\gamma|^2)), \quad (17)$$

wherein the factor ½ appears due to basis reconciliation. Assuming an eavesdropping device 12 with a quantum memory, the eavesdropping device 12 is able to store intercepted photons until basis reconciliation and apply optimal measurements, thus obtaining full information about a bit. Therefore, whenever at least one photon is intercepted by the eavesdropping device 12, the obtained information about the corresponding bit is $$\max I'(A,E) = 0 \cdot P_E(0) + 1 \cdot P_E(\geq 1), \quad (18)$$

wherein $P_E(0)$ and $P_E(\geq 1) = 1 - P_E(0)$ respectively denote the probability that a vacuum state is intercepted and the probability any positive number of photons is intercepted. Due to Poisson statistics, $P_E(0) = \exp(-r_E|\gamma|^2)$ holds. After post-selection and privacy amplification, the amplified key has length $$L_f' = p'(\sqrt{}) L \cdot (1 - \max I'(A,E)) = \tfrac{1}{2}(1 - \exp(-T \cdot (1 - r_E) \cdot |\gamma|^2)) \cdot \exp(-r_E \cdot |\gamma|^2). \quad (19)$$

Figure 9:
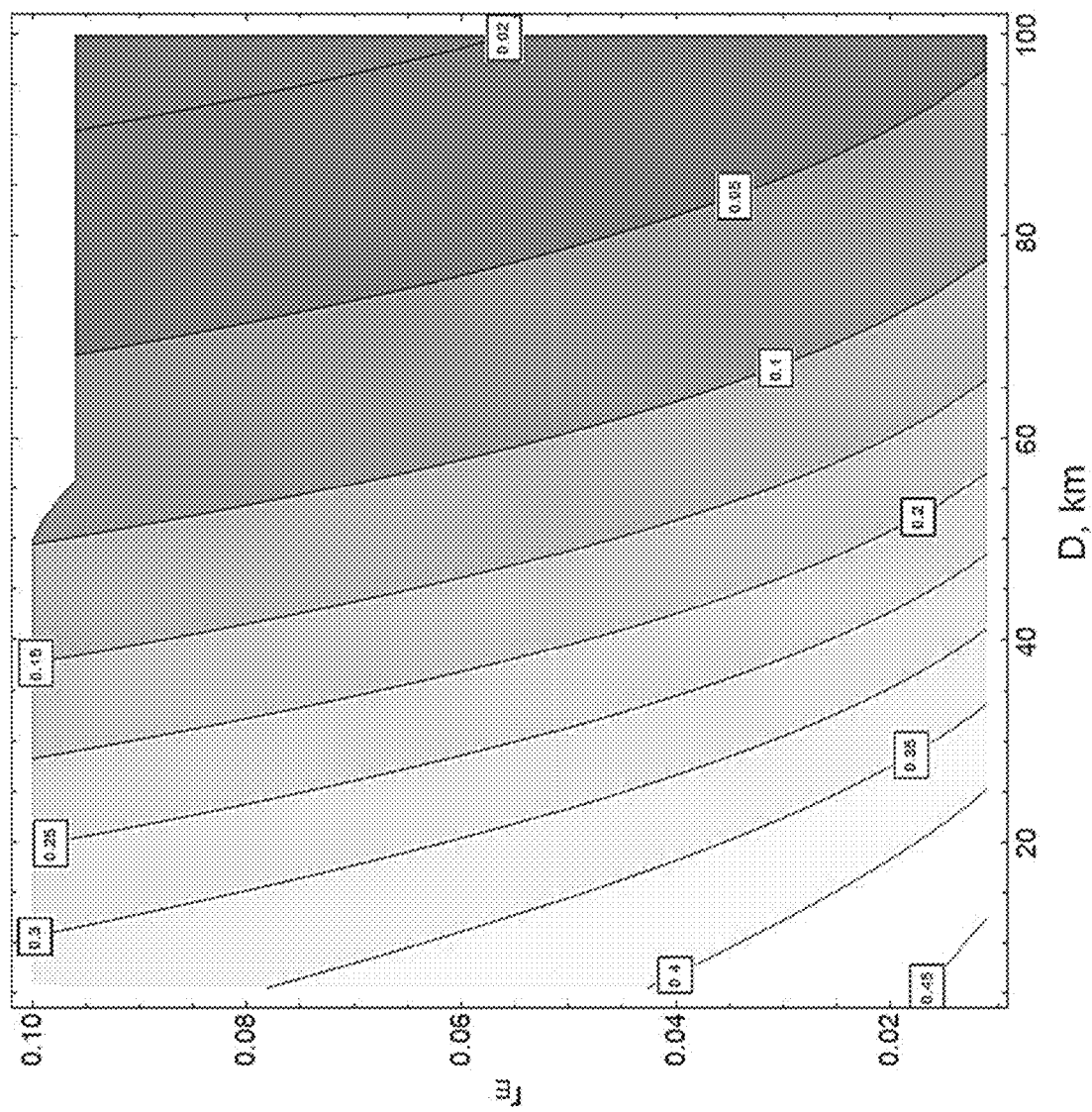
FIG. 9 shows a plot of a maximum key rate as a function of distance and signal loss for a BB-84 protocol.

As described above in the context of the COW QKD protocol, the optimal intensity of the signal pulses may be determined in order to maximise the key lengths $L_f$ and $L_f'$ in Eq. (16) and Eq. (19), respectively. Subsequently, using the optimal intensities, the maximum key rate as a function of the signal loss $r_E$ and the distance D may be determined. FIG. 9 is a corresponding plot of the maximum key rate with $\mu = \tfrac{1}{50}$ km$^{-1}$.

FIG. 10 shows a plot of the key rate ratio $R/R_{orig}$ between the key rate determined for the proposed method, $R = L_f'/L$, and the key rate for original COW protocol, $R_{orig} = L_f/L$ as a function of the distance D and the signal loss $r_E$ with $\mu = \tfrac{1}{50}$ km$^{-1}$ for the decoy-state BB-84 protocol. As can be seen from FIG. 10, if $r_E$ can be controlled to be at 1% of the signal, a key rate more than 20 times larger than the original protocol may be achieved at a distance of 100 km.

The features disclosed in this specification, the figures and/or the claims may be material for the realization of various embodiments, taken in isolation or in various combinations thereof.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for quantum key distribution, the method being implementable in a system with a plurality of data processing devices, the method comprising:
    determining, in at least one of a first data processing device and a second data processing device, an intrinsic loss along a quantum channel between the first data processing device and the second data processing device;
    generating, in the first data processing device, a first signal;
    generating, in the first data processing device, a pulse sequence comprising at least one test pulse and signal pulses generated from the first signal;
    transmitting the pulse sequence from the first data processing device via the quantum channel to the second data processing device;
    receiving the pulse sequence in the second data processing device, and determining, in the second data processing device, a second signal from the pulse sequence;
    determining invalid signal positions and providing the invalid signal positions in the first data processing device and the second data processing device;
    determining, in the first data processing device, a first reconciled signal from the first signal and the invalid signal positions and determining, in the second data processing device, a second reconciled signal from the second signal and the invalid signal positions;
    determining a total loss along the quantum channel from the at least one test pulse received in the second data processing device, determining a signal loss from the total loss and the intrinsic loss, and providing the signal loss in the first and the second data processing device;
    determining a shared key in the first and the second data processing device by error correcting the first reconciled signal in the first data processing device and error correcting the second reconciled signal in the second data processing device; and
    determining an amplified key in the first and the second data processing device from the shared key by shortening the shared key by a shortening amount that is determined from the signal loss.

2. The method according to claim 1, wherein the quantum channel comprises an optical fibre and/or wherein the at least one test pulse and the signal pulses are light pulses.

3. The method according to claim 1, wherein the quantum channel is configured such that the intrinsic loss is homogeneously distributed along the quantum channel.

4. The method according to claim 1, wherein an auxiliary bit sequence is encoded in a single test pulse, wherein preferably the single test pulse is verified in the second data processing device according to the auxiliary bit sequence.

5. The method according to claim 1, wherein the pulse sequence comprises a plurality of test pulses, wherein an auxiliary bit sequence is encoded in the plurality of test pulses, wherein preferably the plurality of test pulses is verified in the second data processing device according to the auxiliary bit sequence.

6. The method according to claim 1, wherein the first reconciled signal is determined from the first signal by discarding the invalid signal positions from the first signal, and/or wherein the second reconciled signal is determined from the second signal by discarding the invalid signal positions from the second signal.

7. The method according to claim 1, wherein the total loss is determined from a first intensity of the at least one test pulse generated in the first data processing device and a second intensity of the at least one test pulse received in the second data processing device.

8. The method according to claim 1, wherein the signal loss is determined by subtracting the intrinsic loss from the total loss.

9. The method according to claim 1, wherein the method further comprises estimating an error rate from the first and/or the second reconciled signal.

10. The method according to claim 1, wherein the shared key is shortened by applying a hashing method on the shared key.

11. The method according to claim 1, wherein the shortening amount is determined from the signal loss and further from an intensity of at least one of the signal pulses.

12. The method according to claim 1, wherein the shortening amount is determined from a product of the signal loss and an intensity of at least one of the signal pulses.

13. The method according to claim 1, wherein the intensity of the signal pulses is adjusted so that a length of the shared key is maximised.

14. The method according to claim 1, wherein the method adheres to at least one of a coherent one-way protocol, a differential phase shift protocol, a BB-84 protocol, a B-92 protocol, a T-12 QKD protocol, a Y-00 QKD protocol, a (4+2)-QKD protocol, a SARG04 QKD protocol, and a six-state protocol.

15. A system for quantum key distribution, the system comprising a plurality of data processing devices, the system configured to perform:
    determining, in at least one of a first data processing device and a second data processing device, an intrinsic loss along a quantum channel between the first data processing device and the second data processing device;
    generating, in the first data processing device, a first signal;
    generating, in the first data processing device, a pulse sequence comprising at least one test pulse and signal pulses generated from the first signal;
    transmitting the pulse sequence from the first data processing device via the quantum channel to the second data processing device;
    receiving the pulse sequence in the second data processing device and determining, in the second data processing device, a second signal from the pulse sequence;
    determining invalid signal positions and providing the invalid signal positions in the first data processing device and the second data processing device;
    determining, in the first data processing device, a first reconciled signal from the first signal and the invalid signal positions and determining, in the second data processing device, a second reconciled signal from the second signal and the invalid signal positions;

determining a total loss along the quantum channel from the at least one test pulse received in the second data processing device, determining a signal loss from the total loss and the intrinsic loss, and providing the signal loss in the first and the second data processing device;

determining a shared key in the first and the second data processing device by error correcting the first reconciled signal in the first data processing device and error correcting the second reconciled signal in the second data processing device; and determining an amplified key in the first and the second data processing device from the shared key by shortening the shared key by a shortening amount that is determined from the signal loss.

* * * * *